Patented Aug. 2, 1932

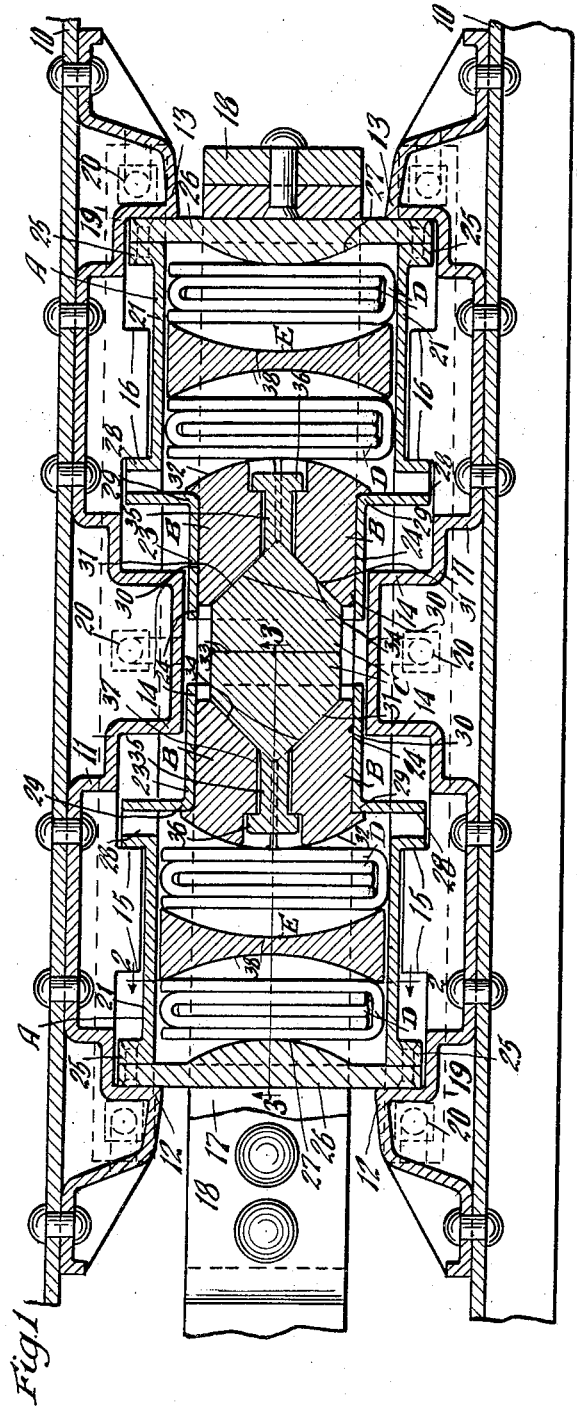

1,869,579

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK ABSORBING MECHANISM

Application filed July 27, 1928. Serial No. 295,657.

This invention relates to improvements in shock absorbing mechanisms.

One object of the invention is to provide a friction shock absorbing mechanism especially adapted for railway draft riggings, having the usual stop castings arranged for spring draft gears of the tandem spring type, including a pair of combined spring cage and friction shell members, each having fixed follower means thereon, the follower means at one end of one of the combined members cooperating with the front main and limiting stop shoulders and the follower means at the other end of said member cooperating with the front intermediate and limiting stop shoulders of the stop castings, and the follower means at the front end of the other combined member cooperating with the rear middle main and the corresponding limiting stop shoulders and the follower means at the rear end of said last named combined member cooperating with the rear main stop shoulders and the corresponding limiting shoulders of said castings, wherein each combined member has a friction wedge system cooperating with the friction shell portion thereof and the wedge system of one member transmits the actuating force to the wedge system of the other member.

Another object of the invention is to provide a friction shock absorbing mechanism, including a combined friction shell and spring cage member, a pair of friction shoes cooperating with the friction shell section thereof, a pressure transmitting block having wedging engagement with the shoes, and a main spring resistance within the cage comprising a plurality of spring plate members, wherein the shoes and wedge have shouldered engagement with each other and the shoes have shouldered engagement with the shell section of the combined member to limit outward movement of the same and the wedge to hold the parts assembled, and the spring cage is provided with a removable end wall to permit insertion of the spring resistance, shoes and wedge within the shell section and the end wall is provided with a curved bearing surface for the plate spring members.

A more specific object of the invention is to provide a shock absorbing mechanism, including a casing having a reduced section at one end, providing a friction shell member, and a removable end wall at the other end, presenting an interior curved bearing surface, a pair of friction shoes cooperating with the friction shell member, the shoes having shouldered engagement with the reduced section of the casing to limit outward movement of the shoes, the shoes having curved bearing faces at the inner ends; a wedge block cooperating with the shoes and having shouldered engagement therewith to limit outward movement of the wedge and a plurality of laminated plate springs interposed between the bearing surface of the end wall and the bearing surfaces of the shoes, the laminated plate springs being separated by spacing means, wherein the wedge, shoes, laminated plate springs and spacing means are insertible through the end of the cage closed by said removable end wall.

Other and further objects of the invention will more clearly appear from the description and claim hereinafter following.

In the drawing, forming a part of this specification, Figure 1 is a horizontal, longitudinal sectional view of a portion of the underframe structure of a railway car, illustrating my improvements in connection therewith. Figure 2 is a transverse, vertical sectional view through the shock absorbing mechanism, corresponding substantially to the line 2—2 of Figure 1. Figure 3 is a longitudinal, vertical sectional view through the shock absorbing mechanism shown at the front end of Figure 1 and corresponding substantially to the line 2—2 of said figure. And Figure 4 is a detailed perspective view of one of the wedge members employed in connection with my improved mechanism.

In said drawing, 10 indicates the usual channel-shaped center or draft sills of a railway car underframe, to the inner sides of which are secured side plates or stop castings 11, commonly employed in connection with spring draft riggings of the tandem type and in connection with which my improvements are particularly designed for use. The castings 11 have the usual front and rear main stop shoulders 12 and 13, intermediate or middle main stop shoulders 14—14, front limiting stop shoulders 15—15, and rear limiting stop shoulders 16—16. The inner end of the coupler shank is designated by 17, to which is operatively connected a yoke 18 of well known form, having the usual top and bottom members and front and rear end vertical connecting members. The shock absorbing mechanism proper, hereinafter more fully described, is disposed within the yoke. The side castings 11 are also provided with supporting plates 19 secured to the bottom sides thereof, which support the friction shock absorbing mechanism in a manner hereinafter pointed out. The supporting guide plates 19 are preferably secured to the castings 11 by means of bolts 20—20, the heads of which are disposed within suitable openings in the castings, the castings being slotted as indicated to permit assembling of the bolts therewith.

My improved shock absorbing mechanism proper comprises, broadly, front and rear combined friction shell and spring cage casings A—A, four friction shoes B—B, two wedge blocks C—C, four laminated plate springs D—D, and two spacing blocks E—E.

The front and rear casings A—A are of similar design but are reversely arranged, as shown in Figure 1. Each casing A is in the form of a substantially rectangular box-like member, having longitudinally disposed, spaced vertical side walls 21—21, horizontally disposed, longitudinally extending, spaced top and bottom walls 22—22. As shown, the shell is open at opposite ends and the inner end portion thereof is reduced in cross section, as most clearly shown in Figure 1, to provide a friction shell section 23. The top and bottom walls of the friction shell section are in alignment with the top and bottom walls of the casing A, but the side walls thereof are inwardly offset with respect to the side walls of the casing proper. The side walls of the friction shell section 23 are provided with interior opposed, longitudinally extending flat friction surfaces 24, which cooperate with the friction shoes in a manner hereinafter pointed out. At the outer end, the casing A has the side walls thereof provided with lateral flanges 25—25 which form part of an end follower member. The outer end of the casing A is closed by a separable wall section 26 which has the opposite end thereof flush with the outer edges of the flanges 25, so that the flanges together with the end wall 26 form the complete end follower. The separable wall section 26 may be secured to the casing A in any suitable manner and is herein shown as riveted thereto, the rivets extending through the end wall and the flanges 25 of the casing A.

On the inner side, the end wall is provided with a transversely disposed convex bearing surface 27, which cooperates with the adjacent laminated plate spring D. Adjacent the friction shell section 23 of the casing A, the same is provided with laterally extending flanges 28—28 which form fixed follower means cooperating with the corresponding stop shoulders of the castings 11. The inwardly offset side wall sections of the friction shell provide interior limiting shoulders 29—29 which cooperate with the friction shoes to limit the outward movement of the latter. As will be evident upon reference to Figure 1, the friction shell section 23 of each casing is of such a size as to be accommodated between the inwardly offset portions of the castings 11 on which the stop shoulders 14 are formed. The end follower members, formed by the flanges on the casing A, overlap the supporting guide plates 19 and the casing is thereby guided for movement on said guide plates.

The friction shoes B—B are four in number, two shoes being associated with each combined friction shell and spring cage A. The shoes are all of similar design, each being in the form of a block having a flat, longitudinally extending outer side face 30, which cooperates with the corresponding friction surface 24 of the friction shell section of the corresponding casing A. On the inner side, each shoe is provided with a flat wedge face 31, adapted to cooperate with the corresponding wedge block C. At the rear end, each shoe is provided with a transversely disposed curved bearing surface 32, the bearing surfaces of the two shoes associated with each friction shell together forming a continuous convex bearing surface which cooperates with the corresponding laminated plate spring D.

The wedge blocks C are of similar design, each having a flat inner end face 33. As shown in Figure 1, the wedge blocks C are reversely arranged and have the flat faces 33 thereof in direct bearing contact. At the inner end, each wedge block is provided with a pair of inwardly diverging wedge faces 34—34, which cooperate respectively with the wedge faces 31—31 of the two friction shoes of one of the combined friction shell and spring cage casings A. Each wedge C is provided with an inwardly extending arm 35 having a T-head 36 at the end thereof. The two friction shoes which cooperate with the wedge block C are cut away to freely accommodate the arm 35 and are shouldered, as indicated at 37—37, to engage with the T-head section of the arm. As will be evident, the shouldered engagement of the portion 36 of the arm with the friction shoes B limits the outward movement of the wedge block and the shouldered engagement of the shoes with the reduced section of the casing A in turn limits outward movement of the friction shoes, whereby the friction shoes and wedge block are maintained in assembled relation with the corresponding friction shell and spring cage casing and outward movement of the same is positively limited.

The laminated plate springs D—D are arranged in pairs in each casing A. The laminated plate springs of each casing are disposed respectively at the front and rear ends thereof and are arranged transversely of the mechanism. Each laminated plate spring D comprises a plurality of spring plate members, preferably two U-shaped plate spring members and a flat plate spring. As clearly shown in Figure 1, the U-shaped spring members are reversely arranged, so that the sections connecting the legs thereof are disposed respectively at opposite sides of the mechanism.

The legs of the two U-shaped spring members are spaced a different distance apart and the legs of one of said U-shaped members embrace the legs of the other, and the flat plate spring is interposed between the leg portions of the innermost U-shaped spring member. As will be evident, the plate spring is thus embraced on opposite sides and at opposite ends by the U-shaped spring members and is thus held in position, thereby preventing the raw end edges of the plate from contacting with the side walls of the casing A and protecting the latter from damage. The U-shaped connecting section of the outermost spring plate member also protects the side walls from damage by the rough end edges of the legs of the inner U-shaped plate spring. The parts of the two U-shaped spring plates are so proportioned that the connecting U-section of the innermost U-shaped plate protrudes slightly beyond the extremities of the legs of the outer U-shaped spring plate, so that the raw end edges of the legs of the outer spring plate member will at all times be held spaced from the corresponding side wall of the casing A.

The two laminated springs D, associated with each casing, are held apart by the corresponding spacing member E. Each spacing member E is in the form of a relatively heavy block fitting within the rectangular casing and having concave bearing surfaces 38—38 on the opposite sides thereof, which accommodate the flexing of the plates of the laminated plate springs D.

In assembling the parts of each friction shock absorbing mechanism, the friction shoes, together with the wedge block C, are first inserted through the open outer end of the corresponding casing A. The inner most laminated plate spring D, the spacing block E and the outermost plate spring D are then inserted within the casing in succession and the end wall 26 is applied to close the casing, the same being secured by rivets to the flanges 25 of said casing.

The normal full release position of the mechanism is shown in Figure 1, and, as shown in said figure, the wedge blocks C are in engagement with each other and the friction shoes bear directly on the adjacent laminated plate springs D of the front and rear casings A. The outer laminated plate springs D of the casings A bear directly on the convex bearing surfaces of the end walls of the front and rear casings A and the spacing members E are in bearing contact with the two laminated plate springs of each casing. The fixed end follower at the front end of the front casing A is in bearing engagement with the front main stop shoulders 12 of the castings 11 and the fixed end follower section at the inner end of said casing is in engagement with the innermost of the front limiting stop shoulders 15, while the fixed end follower section at the rear end the rear casing is in engagement with the rear main stop shoulders 13 and the fixed end follower section at the front end of said casing is in engagement with the innermost limiting stop shoulders 16.

When the parts are assembled, the laminated plate springs are preferably placed under slight initial compression so that all of the parts will be maintained in their operative position.

The operation of my improved shock absorbing mechanism is as follows: Assuming an inward or buffing movement of the coupler, the front casing A will be forced inwardly, thereby forcing the wedge block C of the front casing against the wedge block C of the rear casing. As movement of the wedge block C of the rear casing is opposed by the laminated springs D of said casing, which cooperate with the friction shoes, inward movement of the front casing A will be yieldingly opposed.

Due to the resistance offered, there will be relative movement induced between the friction shoes B of the front casing A and the friction shell section thereof, and the laminated plate springs D, associated with said casings, will be flexed between the bearing surfaces of the end wall 26, the spacing block E and the convex bearing surfaces on the friction shoes B. At the same time, the wedge block C of the rear casing will be forced inwardly of said casing, causing the friction shoes B to slide on the friction surfaces of the friction shell section 23 thereof and compressing the laminated springs D, the latter being flexed between the convex bearing surfaces on the friction shoes, the spacing block E and the convex bearing surface on the end wall of the casing. As will be evident, the rear casing A is positively held against movement by engagement of the fixed follower section thereof with the stop shoulders 13 of the castings 11. Inward movement of the front casing A will be limited by engagement of the follower sections at the front and rear ends thereof respectively, with the outermost of the stop shoulders 15 and 14. The parts are preferably so proportioned that the casings A will also engage each other when the follower sections of the front casing engage the stop shoulders of the castings 11.

During a draft action, the operation will be substantially the same as during buff, but the front casing A will be held stationary while the rear casing is pulled forwardly. During the draft action, forward movement of the front casing A is limited by engagement of the follower sections thereof with the stop shoulders 12 at the front ends of the castings 11 and the innermost stop shoulders 15. Forward movement of the rear casing A will be limited by engagement of the follower sections at the front and rear ends of said casing with the corresponding stop shoulders 14 and 16 of the stop castings 11.

Upon the actuating force being reduced in release, the tendency of the plate springs to return to their normal straight condition will force the friction shoes outwardly until movement thereof is limited by engagement with the stop shoulders 29 of the casings A. Outward movement of the wedge blocks is limited by engagement of the head sections 36 thereof with the shoulders on the corresponding friction shoes.

From the preceding description, taken in connection with the drawing, it will be evident that I have provided a highly efficient friction shock absorbing mechanism, wherein, in addition to the frictional resistance provided between the friction shoes and friction shells and the yielding resistance provided by the laminated plate springs, additional frictional resistance is had, due to relative slippage of the plate members of the springs on each other during flexing of the same.

While I have herein shown and described what I consider the preferred manner of carrying out my invention, the same is merely illustrative and I contemplate all changes and modifications which come within the scope of the claim appended hereto.

I claim:

In a shock absorbing mechanism, the combination with a casing having a reduced section at one end, forming a friction shell, said casing being closed at the opposite end by a separable end wall member; of friction shoes; a cooperating wedge member; and a main spring resistance, said friction shoes, wedge member and main spring resistance being insertible through the last named end of the casing when said wall section is detached, said shoes having shouldered engagement with the reduced section of the casing to limit outward movement of the shoes, and the wedge having shouldered engagement with the shoes to limit outward movement of the wedge, said main spring resistance including front and rear laminated spring plate members separated by spacing means, said shoes having convex bearing surfaces cooperating with one of the laminated plate spring members, said end wall having a convex bearing surface cooperating with the other laminated spring member and said spacing means having concave bearing surfaces opposed to said convex bearing surfaces cooperating with said laminated plate spring members.

In witness that I claim the foregoing I have hereunto subscribed my name this 25th day of July, 1928.

JOHN F. O'CONNOR.